United States Patent
Camosy

(10) Patent No.: US 9,409,609 B2
(45) Date of Patent: Aug. 9, 2016

(54) WAKE CONVERGENCE DEVICE FOR A PICK-UP TRUCK

(71) Applicant: Auto Research Center, LLC, Indianapolis, IN (US)

(72) Inventor: Michael Camosy, Indianapolis, IN (US)

(73) Assignee: Auto Research Center, LLC, Indianapolis, IN (US)

( * ) Notice: Subject to any disclaimer, the term of this patent is extended or adjusted under 35 U.S.C. 154(b) by 0 days.

(21) Appl. No.: 14/666,533

(22) Filed: Mar. 24, 2015

(65) Prior Publication Data

US 2015/0266521 A1 Sep. 24, 2015

Related U.S. Application Data

(63) Continuation-in-part of application No. 61/969,519, filed on Mar. 24, 2014.

(51) Int. Cl.
*B62D 27/06* (2006.01)
*B62D 35/00* (2006.01)

(52) U.S. Cl.
CPC .............. *B62D 35/007* (2013.01); *B62D 27/06* (2013.01)

(58) Field of Classification Search
CPC .... B62D 35/001; B62D 35/00; B62D 35/004; B62D 35/007; B62D 37/02; B62D 35/02; B62D 63/08; B64C 23/06; B64C 2230/04; B64C 2230/06; B64C 23/00; B64C 21/025; B64C 2230/20; B60J 1/2008; B60J 5/108; B60J 5/062; B60J 5/125
USPC ............... 296/180.4, 208, 96.15, 26.07, 37.6, 296/210, 152, 91; 180/903, 116, 127, 89.1; 293/117
See application file for complete search history.

(56) References Cited

U.S. PATENT DOCUMENTS

| | | | |
|---|---|---|---|
| 2,933,344 A | 4/1960 | Shumaker |
| 3,010,754 A | 11/1961 | Shumaker |
| 3,276,811 A | 10/1966 | Schmidt |
| 3,596,975 A | 8/1971 | Stephen |
| 3,960,402 A | 6/1976 | Keck |
| 3,999,797 A | 12/1976 | Kirsch et al. |
| 4,142,755 A | 3/1979 | Keedy |

(Continued)

FOREIGN PATENT DOCUMENTS

| | | |
|---|---|---|
| DE | 102008036888 | 2/2010 |
| WO | 2013188669 | 12/2013 |

OTHER PUBLICATIONS

Aerodynamic Trailer Systems, LLC SmartTail® The Trucking Industry's First Totally Automated Trailer Air Spoiler from www.ats-green.com/smarttail.htm (2pages), Jan. 13, 2014.

(Continued)

*Primary Examiner* — Glenn Dayoan
*Assistant Examiner* — Sunsurraye Westbrook
(74) *Attorney, Agent, or Firm* — Ice Miller LLP

(57) ABSTRACT

A wake convergence device for a pick-up truck is provided. The wake convergence device is spaced from the top of a pick-up truck and from the sides of the pick-up truck. The wake convergence device is moveably coupled to an aft end of the cab of the pick-up truck. When the truck is not in motion, the wake convergence device is positioned around the aft end of the pick-up truck. When the truck is in motion, the wake convergence device is moved upward and raised from the cab of the pick-up truck.

20 Claims, 5 Drawing Sheets

(56) References Cited

U.S. PATENT DOCUMENTS

| | | | |
|---|---|---|---|
| 4,174,863 A * | 11/1979 | Gotz | B62D 35/007 296/180.5 |
| 4,214,787 A | 7/1980 | Chain | |
| 4,309,053 A | 1/1982 | Lett | |
| 4,316,630 A | 2/1982 | Evans | |
| 4,320,920 A | 3/1982 | Goudey | |
| 4,357,045 A | 11/1982 | Kinford, Jr. | |
| 4,417,760 A | 11/1983 | Koch | |
| 4,421,354 A | 12/1983 | Lemaster | |
| 4,603,898 A * | 8/1986 | Udagawa | B62D 35/007 15/250.001 |
| 4,735,381 A | 4/1988 | Wood | |
| 4,809,003 A | 2/1989 | Dominek et al. | |
| 4,881,772 A | 11/1989 | Feinberg | |
| 5,112,120 A | 5/1992 | Wood | |
| 5,199,762 A | 4/1993 | Scheele et al. | |
| 5,280,990 A | 1/1994 | Rinard | |
| 5,374,013 A | 12/1994 | Bassett et al. | |
| 5,382,070 A | 1/1995 | Turner | |
| 5,498,059 A | 3/1996 | Switlik | |
| 5,658,038 A | 8/1997 | Griffin | |
| 5,823,610 A | 10/1998 | Ryan et al. | |
| 5,901,925 A | 5/1999 | McGrath et al. | |
| 5,901,929 A | 5/1999 | Banks | |
| 6,131,853 A | 10/2000 | Bauer et al. | |
| 6,183,041 B1 * | 2/2001 | Wilson | B60J 1/20 296/180.1 |
| 6,241,302 B1 | 6/2001 | Rehkopf | |
| 6,257,654 B1 | 7/2001 | Boivin et al. | |
| 6,286,892 B1 | 9/2001 | Bauer et al. | |
| 6,485,087 B1 | 11/2002 | Roberge et al. | |
| 6,616,218 B2 | 9/2003 | Bauer et al. | |
| 6,666,498 B1 | 12/2003 | Whitten | |
| 6,685,256 B1 | 2/2004 | Shermer | |
| 6,742,616 B2 | 6/2004 | Leban | |
| 6,799,791 B2 | 10/2004 | Reiman et al. | |
| 6,854,788 B1 | 2/2005 | Graham | |
| 6,959,958 B2 | 11/2005 | Basford | |
| 6,986,544 B2 | 1/2006 | Wood | |
| 7,008,005 B1 | 3/2006 | Graham | |
| 7,207,620 B2 | 4/2007 | Cosgrove et al. | |
| 7,240,958 B2 | 7/2007 | Skopic | |
| 7,255,387 B2 | 8/2007 | Wood | |
| 7,318,620 B2 | 1/2008 | Wood | |
| 7,374,229 B1 * | 5/2008 | Noll | B62D 25/182 296/180.2 |
| 7,431,381 B2 | 10/2008 | Wood | |
| 7,484,791 B1 | 2/2009 | Chen | |
| 7,537,270 B2 | 5/2009 | O'Grady | |
| 7,585,015 B2 | 9/2009 | Wood | |
| 7,618,086 B2 | 11/2009 | Breidenbach | |
| 7,625,034 B1 | 12/2009 | Fitzgerald | |
| 7,641,262 B2 | 1/2010 | Nusbaum | |
| 7,699,382 B2 | 4/2010 | Roush | |
| 7,740,304 B1 | 6/2010 | Breu | |
| 7,748,771 B2 | 7/2010 | Distel et al. | |
| 7,765,044 B2 | 7/2010 | Neuburger | |
| 7,784,854 B2 | 8/2010 | Breidenbach | |
| 7,837,254 B2 | 11/2010 | Reiman et al. | |
| 7,845,708 B2 | 12/2010 | Breidenbach | |
| 7,850,224 B2 | 12/2010 | Breidenbach | |
| 7,854,468 B2 | 12/2010 | Vogel et al. | |
| 7,857,376 B2 | 12/2010 | Breidenbach | |
| 7,862,102 B1 | 1/2011 | Benton | |
| 7,950,720 B2 | 5/2011 | Skopic | |
| 7,976,096 B2 | 7/2011 | Holubar | |
| 8,007,030 B2 | 8/2011 | Wood | |
| 8,025,329 B1 | 9/2011 | Kron | |
| 8,025,330 B2 | 9/2011 | Reiman et al. | |
| 8,033,594 B2 | 10/2011 | Nusbaum | |
| 8,091,951 B1 | 1/2012 | Fitzgerald | |
| 8,100,461 B2 | 1/2012 | Smith et al. | |
| 8,136,868 B2 | 3/2012 | Nusbaum | |
| 8,177,287 B2 | 5/2012 | Vogel et al. | |
| 8,196,993 B2 | 6/2012 | Smith et al. | |
| 8,196,994 B2 | 6/2012 | Chen | |
| 8,196,995 B2 | 6/2012 | Chen | |
| 8,235,456 B2 | 8/2012 | Nusbaum | |
| 8,251,436 B2 | 8/2012 | Henderson et al. | |
| 8,272,680 B2 | 9/2012 | Breidenbach | |
| 8,303,025 B2 | 11/2012 | Senatro | |
| 8,342,585 B1 | 1/2013 | Cooper et al. | |
| 8,342,594 B2 | 1/2013 | Benton | |
| 8,360,507 B2 | 1/2013 | Benton | |
| 8,360,509 B2 | 1/2013 | Smith et al. | |
| 8,360,510 B2 | 1/2013 | Smith et al. | |
| 8,382,194 B2 | 2/2013 | Wood | |
| 8,480,161 B2 | 7/2013 | Pfaff | |
| 8,480,162 B2 | 7/2013 | Breidenbach | |
| 8,491,036 B2 | 7/2013 | Henderson et al. | |
| 8,492,036 B2 | 7/2013 | Kim et al. | |
| 8,579,357 B2 | 11/2013 | Nusbaum | |
| 8,622,461 B2 | 1/2014 | Breidenbach | |
| 8,672,391 B1 | 3/2014 | Cobb | |
| 8,684,447 B2 | 4/2014 | Henderson et al. | |
| 8,697,047 B2 | 4/2014 | Lebuannec et al. | |
| 8,708,399 B2 | 4/2014 | Smith et al. | |
| 8,746,779 B1 | 6/2014 | Mazyan | |
| 8,770,649 B2 | 7/2014 | Praskovsky et al. | |
| 8,770,650 B1 | 7/2014 | Brosseau | |
| 8,777,297 B2 | 7/2014 | Meredith et al. | |
| 8,783,757 B2 | 7/2014 | Henderson et al. | |
| 2006/0103167 A1 * | 5/2006 | Wong | B62D 35/001 296/180.1 |
| 2007/0089531 A1 | 4/2007 | Wood | |
| 2008/0116715 A1 | 5/2008 | Steel | |
| 2008/0157560 A1 | 7/2008 | Spector | |
| 2009/0026797 A1 | 1/2009 | Wood | |
| 2009/0236872 A1 | 9/2009 | Wood | |
| 2010/0106380 A1 | 4/2010 | Salari et al. | |
| 2010/0194144 A1 | 8/2010 | Sinha | |
| 2011/0115254 A1 | 5/2011 | Skopic | |
| 2012/0126572 A1 | 5/2012 | Hjelm et al. | |
| 2012/0292495 A1 | 11/2012 | Hashimoto et al. | |
| 2013/0076063 A1 | 3/2013 | Ryan et al. | |
| 2013/0076064 A1 | 3/2013 | Smith et al. | |
| 2013/0106136 A1 | 5/2013 | Smith et al. | |
| 2013/0175824 A1 | 7/2013 | Smith et al. | |
| 2013/0214557 A1 | 8/2013 | Smith et al. | |
| 2014/0019010 A1 | 1/2014 | Smith et al. | |
| 2014/0117713 A1 | 5/2014 | Baker | |

OTHER PUBLICATIONS

Kodiak Innovations—"Bumper Bullet" from www.slipstreemaero.com (2 pages), Jan. 13, 2014.
Aerovolution—Revolutionary Inflatable Aerodynamic Solutions from www.aerovolution.com/information.shtml (2 pages), Oct. 13, 2014.
SmartTruck New Product Release: Low Profile Side Fairings Changing the Shape of Trucking, slide show for Mid-America Trucking Show, (7 pages), Mar. 21-23, 2013.
Trailer Fairings Be Road Smart from www.beroadsmart.com/Vortex_Generators-2.html (2 pages), Jan. 9, 2014.
Solus Aero Package from www.solusinc.com/aero.html (2 pages), Jan. 9, 2014.
Slipstreem Aerodynamics Homepage www.slipstreemaero.com (1 page).
Spoiler from www.ats-green.com/smarttail.htm (2 pages), May 8, 2015.
PCT /US2013/045661 International Search Report dated Nov. 14, 2013 (2 pages).
PCT/US2013/045661 Written Opinion of the International Searching Authority dated Nov. 14, 2013 (5 pages).
PCT/US2013/045661 International Preliminary Report on Patentability dated Nov. 14, 2013 (6 pages).

* cited by examiner

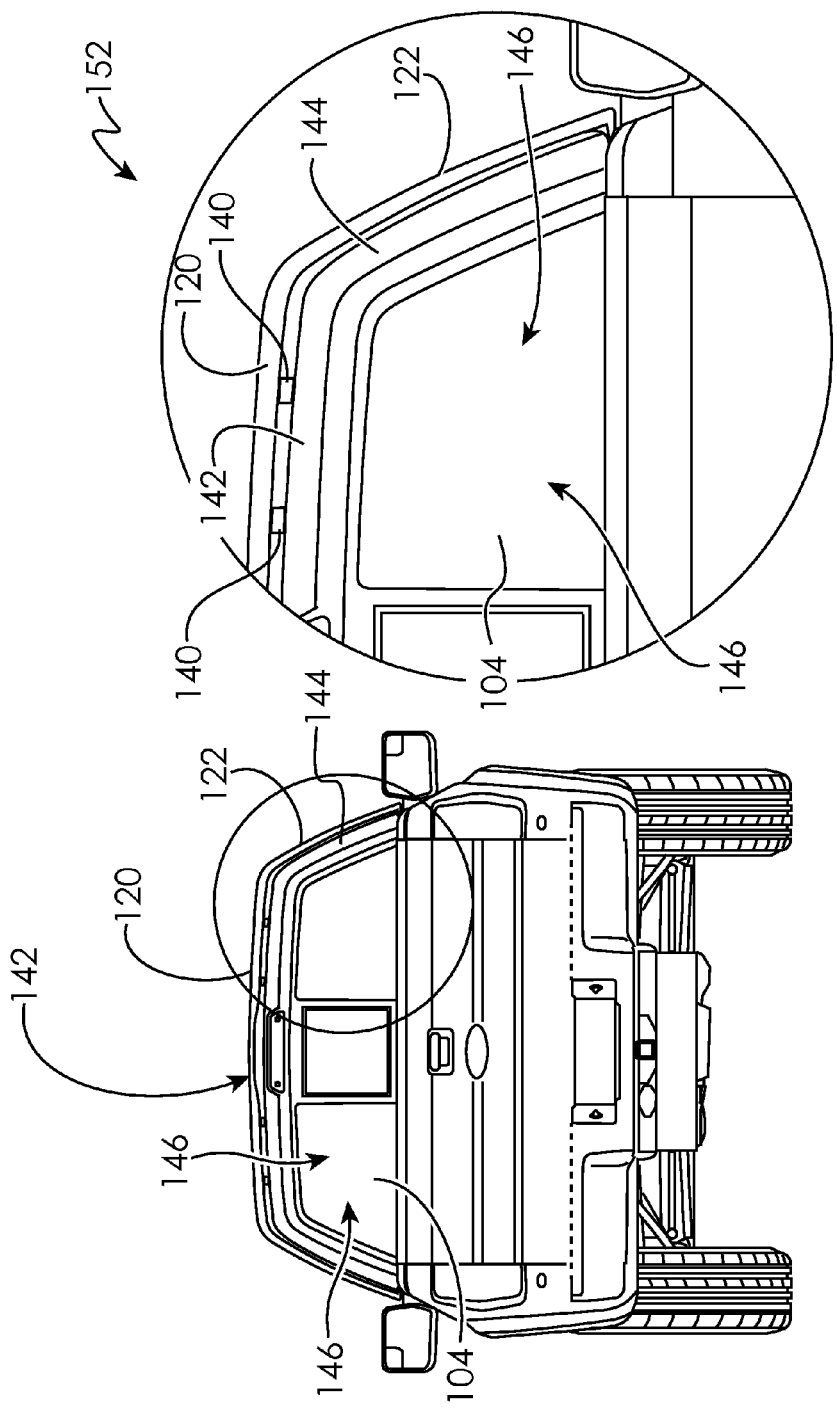

WAKE CONVERGENCE DEVICE FOR A PICK-UP TRUCK

CROSS-REFERENCE TO RELATED APPLICATIONS

The present application is a non-provisional of and claims priority to U.S. Patent Application Ser. No. 61/969,519, filed Mar. 24, 2014 and having the title "WAKE CONVERGENCE DEVICE FOR A PICK-UP TRUCK," which is herein incorporated by reference in its entirety.

TECHNICAL FIELD OF THE DISCLOSED EMBODIMENTS

The embodiments herein generally relate to aerodynamics for vehicles and, more particularly, to a wake convergence device for a pick-up truck.

BACKGROUND OF THE DISCLOSED EMBODIMENTS

Over the years, the cost of rising fuel has become more and more of a concern. However, with the increase of fuel costs to over $100 per barrel of oil, the concern over fuel costs has never been greater. The significant rise in fuel costs coupled with the federal government's strategy of becoming less dependent on foreign oil has led to the automotive industry designing pick-up trucks for better fuel efficiency. A significant way of improving fuel economy on any vehicle is through improving the vehicle's aerodynamic efficiencies (mainly through aerodynamic drag reduction).

SUMMARY OF THE DISCLOSED EMBODIMENTS

In one embodiment, a wake convergence device for a pick-up truck is provided. The wake convergence device is spaced from the top of a pick-up truck and from the sides of the pick-up truck. The wake convergence device is moveably coupled to an aft end of the cab of the pick-up truck. When the truck is not in motion, the wake convergence device is positioned around the aft end of the pick-up truck. When the truck is in motion, the wake convergence device is moved upward and raised from the cab of the pick-up truck.

In one embodiment, a wake convergence device for a pick-up truck is provided. The wake convergence device includes a top panel spaced from a top of a cab of a pick-up truck. At least one side panel is spaced from a side of the cab. The wake convergence device is moveable between a stowed position and a deployed position. The top panel is spaced a first distance from the cab and the at least one side panel is spaced a second distance from the cab in the stowed position. The top panel is spaced a third distance from the cab and the at least one side panel is spaced a fourth distance from the cab in the deployed position.

In a further embodiment of the above, the third distance is greater than the first distance.

In a further embodiment of any of the above, the fourth distance is greater than the second distance.

In a further embodiment of any of the above, the wake convergence device is positioned at an aft end of the cab.

In a further embodiment of any of the above, when in the deployed position, at least a portion of the wake convergence device is positioned aft of an aft end of the cab.

In a further embodiment of any of the above, the top panel includes a leading edge and a trailing edge. The leading edge rotates at least one of up or down with respect to the top of the cab.

In a further embodiment of any of the above, the top panel includes a leading edge and a trailing edge. The trailing edge rotates at least one of up or down with respect to the top of the cab.

In a further embodiment of any of the above, the at least one side panel includes a leading edge and a trailing edge. The leading edge rotates at least one of in or out with respect to the side of the cab.

In a further embodiment of any of the above, the at least one side panel includes a leading edge and a trailing edge. The trailing edge rotates at least one of in or out with respect to the side of the cab.

In a further embodiment of any of the above, the wake convergence device moves to the deployed position when the pick-up truck reaches a pre-determined speed.

In one embodiment, a wake convergence device for a pick-up truck is provided. The wake convergence device includes at least one panel spaced from a cab of a pick-up truck. An actuating device couples the at least one panel to the cab. The actuating device moves the at least one panel between a stowed position and a deployed position. The at least one panel is spaced a first distance from the cab in the stowed position. The at least one panel is spaced a second distance from the cab in the deployed position.

In a further embodiment of any of the above, the second distance is greater than the first distance.

In a further embodiment of any of the above, the at least one panel is positioned at an aft end of the cab.

In a further embodiment of any of the above, when in the deployed position, at least a portion of the at least one panel is positioned aft of an aft end of the cab.

In a further embodiment of any of the above, the at least one panel includes a leading edge and a trailing edge. The leading edge rotates at least one of up or down with respect to the top of the cab.

In a further embodiment of any of the above, the at least one panel includes a leading edge and a trailing edge. The trailing edge rotates at least one of up or down with respect to the top of the cab.

In a further embodiment of any of the above, the at least one panel includes a leading edge and a trailing edge. The leading edge rotates at least one of in or out with respect to the side of the cab.

In a further embodiment of any of the above, the at least one panel includes a leading edge and a trailing edge. The trailing edge rotates at least one of in or out with respect to the side of the cab.

In a further embodiment of any of the above, the at least one panel moves to the deployed position when the pick-up truck reaches a pre-determined speed.

In a further embodiment of any of the above, the at least one panel is capable of breaking away from the actuating device.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein:

FIG. 5A illustrates a rear view of a pick-up truck having a wake convergence device positioned in a deployed position.

FIG. 5B illustrates an expanded rear view of a pick-up truck having a wake convergence device positioned in a deployed position.

DETAILED DESCRIPTION OF THE DISCLOSED EMBODIMENTS

Figure 1:
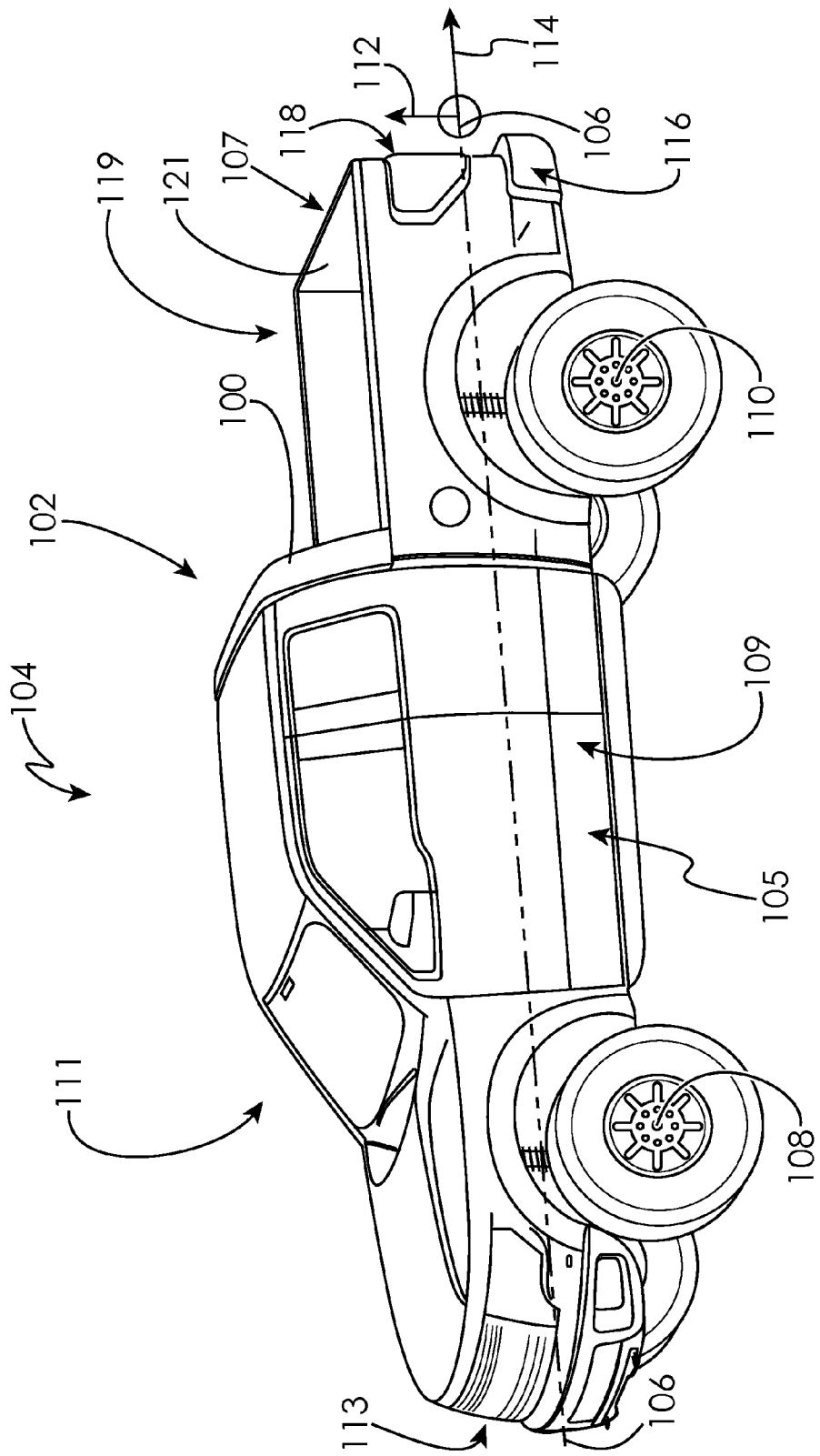
FIG. 1 illustrates a side perspective view of a pick-up truck having a wake convergence device positioned thereon.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
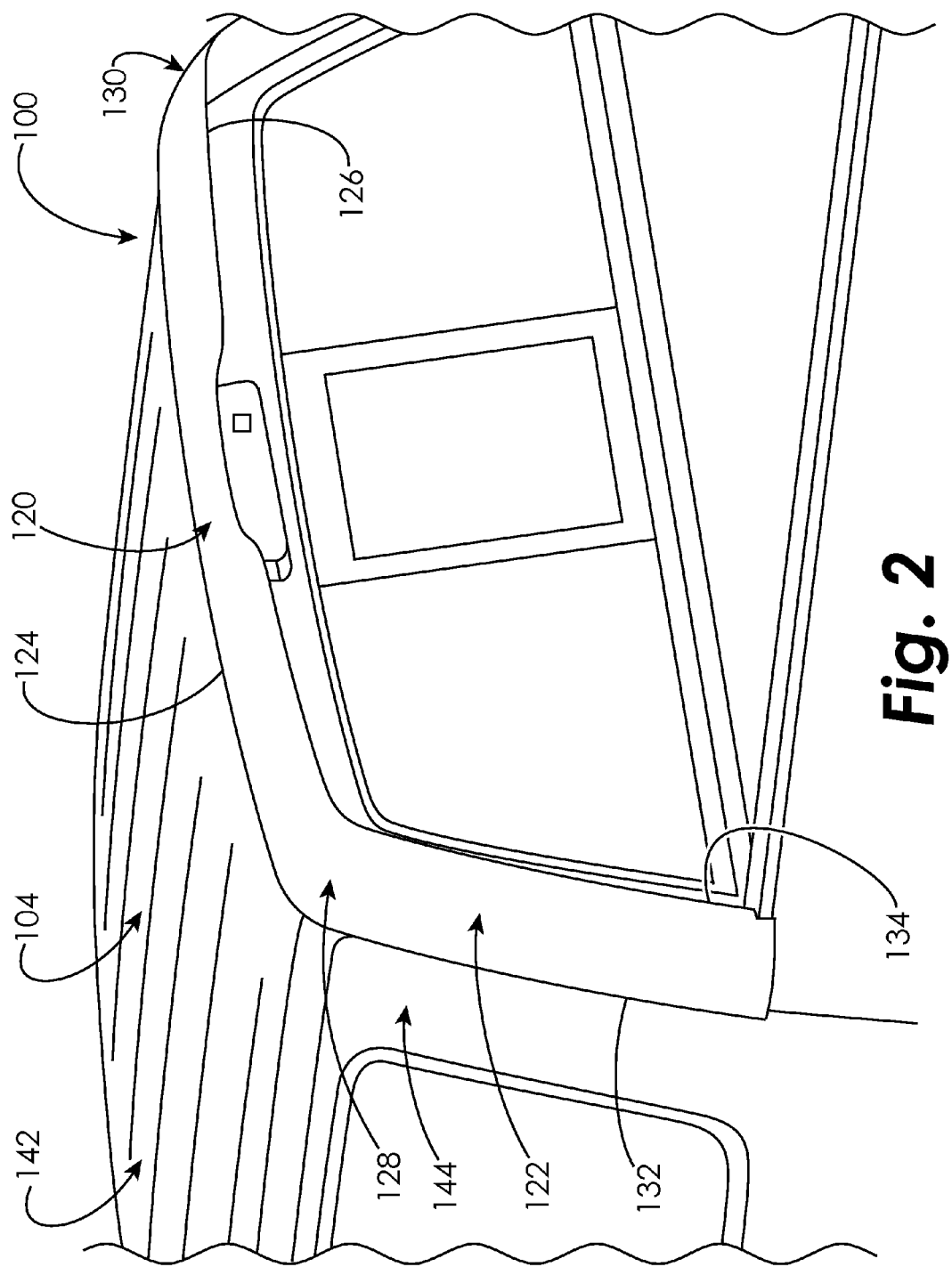
FIG. 2 illustrates a rear perspective view of a pick-up truck having a wake convergence device positioned thereon.
Figure 3:
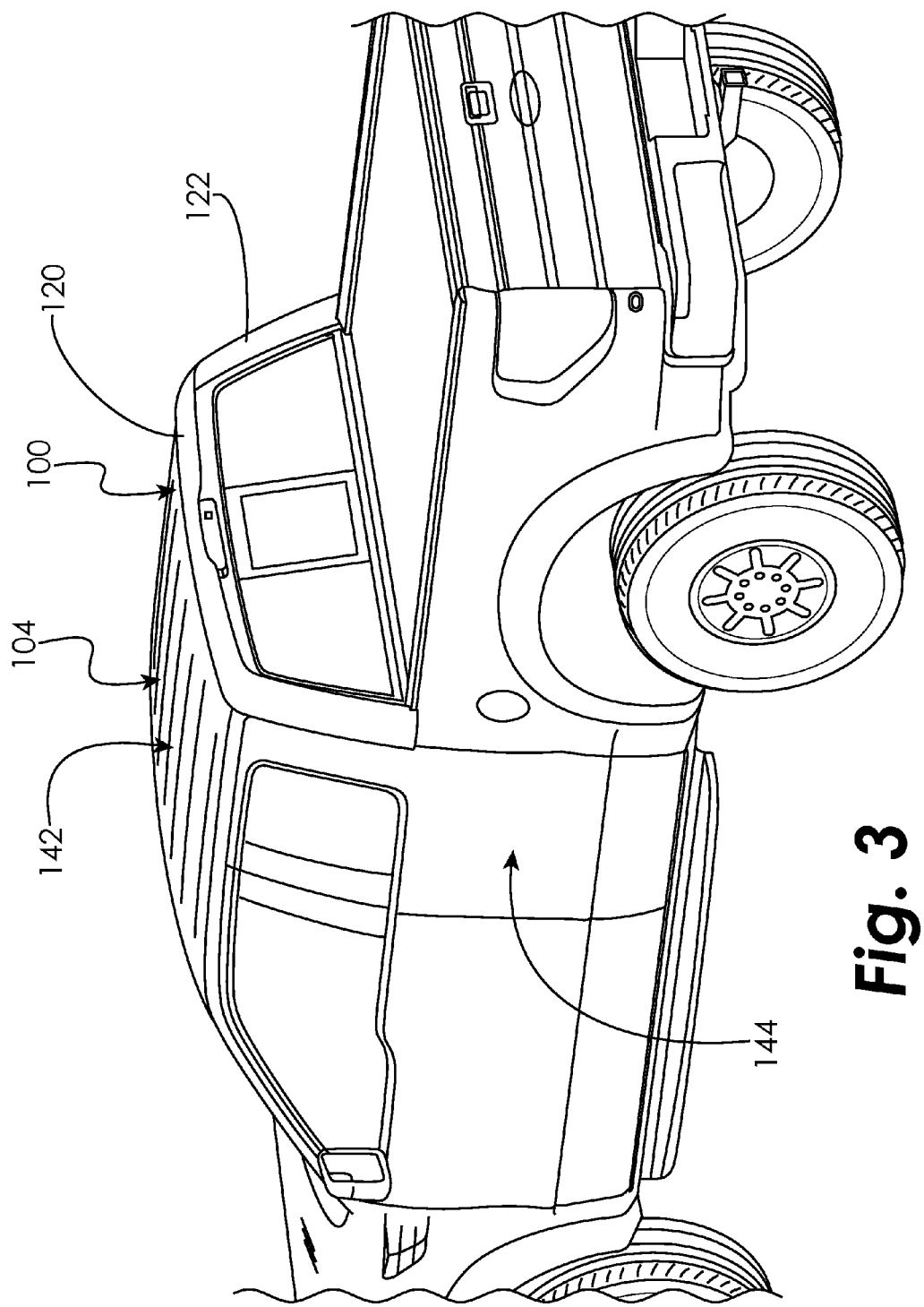
FIG. 3 illustrates a rear perspective view of a pick-up truck having a wake convergence device positioned thereon.
Figure 4A:
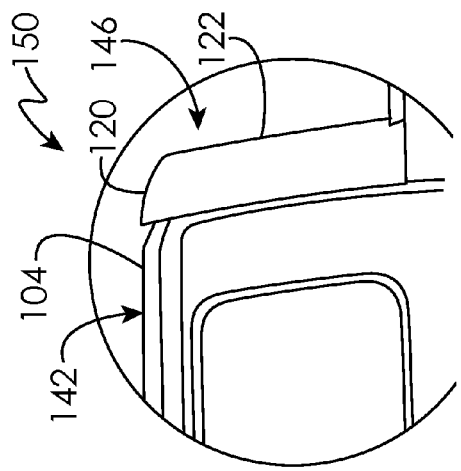
FIG. 4A illustrates a side view of a pick-up truck having a wake convergence device positioned in a stowed position.
Figure 4B:
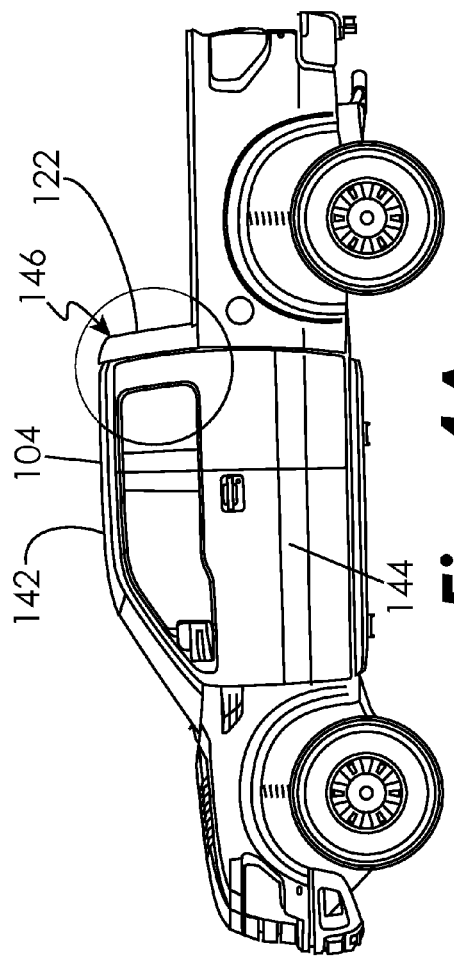
FIG. 4B illustrates an expanded side view of a pick-up truck having a wake convergence device positioned in a stowed position.
Figure 4C:
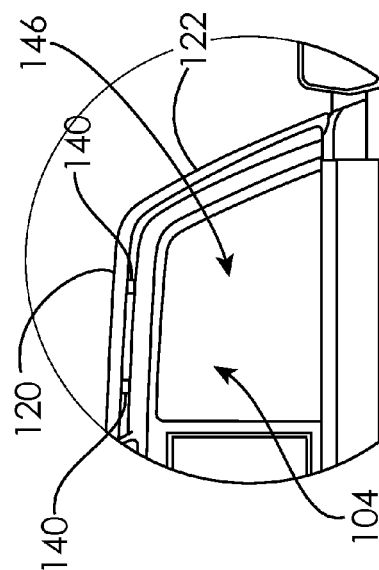
FIG. 4C illustrates a rear view of a pick-up truck having a wake convergence device positioned in a stowed position.
Figure 4D:
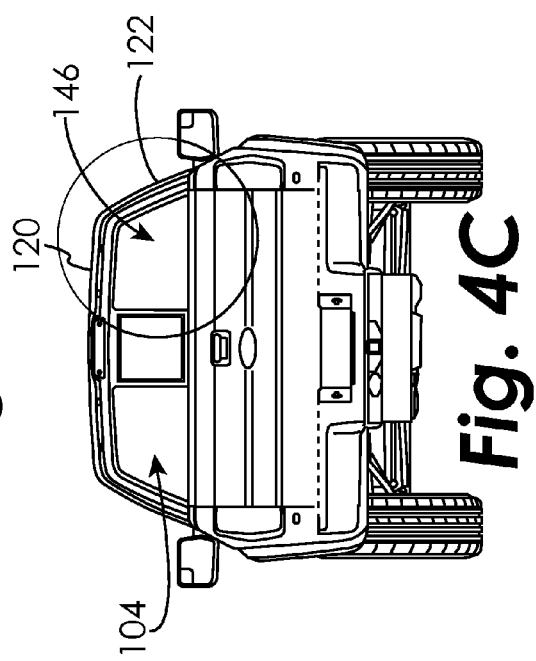
FIG. 4D illustrates an expanded rear view of a pick-up truck having a wake convergence device positioned in a stowed position.

As illustrated in FIGS. 1-5, a wake convergence device 100 is provided in accordance with an embodiment. The wake convergence device 100 is configured to be attached to the back end 102 of a pick-up truck cab 104, wherein the pick-up truck 105 includes a centerline 106 that bisects the front axle axis 108 and rear axle axis 110 of the pick-up truck 105 and lies within a vertical plane 112 and horizontal plane 114. The wake convergence device 100 1) directs streamline flow to the rear 107 of the pick-up truck 105 increasing the pressure in the low pressure wake behind the pick-up truck 105; 2) straightens the flow curvature on the sides 109 and top 111 of the pick-up truck 105 to reduce flow mixing and thereby reduce overall vehicle turbulence shedding; 3) reduces corner vortex shedding strength at the corners 116 of the pick-up truck cab's trailing edge 118; 4) reduces vehicle trailing edge spray; 5) reduces overall vehicle buffeting; and 6) reduces mechanical drag.

The wake convergence device 100 includes a top panel 120 and two side panels 122 (although the panels may be formed in multiple discrete sections or formed as a unitary structure). The top panel 120 includes a leading edge 124 (facing the front 113 of the pick-up truck 105) and a trailing edge 126 (facing the back 107 of the pick-up truck 105). In at least one embodiment, the top panel 120 measures approximately 2 to 6 inches from the leading edge 124 to the trailing edge 126. The top panel 120 has a length of approximately 56-64 inches from a first end 128 to a second end 130. The top panel 120 may be planar or have a rounded cross-section. The top panel 120 angles toward the horizontal plane 114 of the pick-up truck 105 from the leading edge 124 to the trailing edge 126 at an angle of approximately 11° to 15°. The side panels 122 include a leading edge 132 (facing the front 113 of the pick-up truck 105) and a trailing edge 134 (facing the back 115 of the pick-up truck 105). In at least one embodiment, the side panels 122 measure approximately 2 to 6 inches from the leading edge 132 to the trailing edge 134. The side panels 122 extend substantially from the top panel 120 to a top 119 of the pick-up truck bed 121 in some embodiments. The side panels 120 may be planar or have a rounded cross-section. The side panels 120 angle toward the vertical plane 112 of the pick-up truck 105 from the leading edge 132 to the trailing edge 134 at an angle of approximately 11° to 15°. The top panel 120 and side panels 122 may be joined to the cab 104 of the pick-up truck 105 with a moveable bracket 140 that enables the wake convergence device 100 to move from a stowed position 150, shown in FIGS. 4A-4D to a deployed position 152, shown in FIGS. 5A and 5B. In some embodiments, the wake convergence device 100 is moved manually by means of a lever accessible from inside the cab 104. In other embodiments, the wake convergence device 100 is moved by an appropriate motorized linkage. In the deployed position 150, the wake convergence device 100 is spaced from the top 142 of a pick-up truck cab 104 and from the sides 144 of the pick-up truck cab 104 by the moveable brackets 140. In one embodiment, the wake convergence device 100 is spaced approximately 1-3 inches from the pick-up truck cab 104.

In a stowed position 150, the wake convergence device 100 is stowed over the aft end 146 of the cab 104 of the pick-up truck 105. The cab 104 of the pickup truck 105 may have a recess into which the wake convergence device 100 is stowed in some embodiments. To improve the aerodynamics of the pick-up truck 105 when the pick-up truck 105 is moving, the wake convergence device 100 may be moved outward on the moveable brackets 140 to the deployed position 152. In the deployed positioned 152 the wake convergence 100 is raised from the cab 104 of the pick-up truck 105. In some embodiments, the wake convergence device 100 may be automatically moved outward on the moveable brackets 140 to the deployed position 152, such as under the control of an appropriate controller that determines from a speed sensor that the pick-up truck 105 is moving, whereby the controller actuates the motorized linkage of the moveable brackets 140 to move the wake convergence device 100 to the deployed position 152.

In at least one embodiment, the wake convergence device 100 also slides toward an aft end 107 of the pick-up truck 105 when moved to the deployed position 152. In such an embodiment, in the deployed position 152, at least a portion of the wake convergence device 100 is positioned aft of the cab 104 of the pick-up truck 105. In at least one embodiment, the entire wake convergence device 100 is positioned aft of the cab 104 of the pick-up truck 105. In at least one embodiment, only the trailing edges 126 and 134 of the wake convergence device 100 are positioned aft of the cab 104 of the pick-up truck 105 and the leading edges 124 and 132 of the wake convergence device 100 are positioned over and to the sides of the aft end 146 of the cab 104 of the pick-up truck 105.

In at least one embodiment, the wake convergence device 100 is moved to the deployed position 152 when the pick-up truck 105 reaches a pre-determined speed. In at least one embodiment, the wake convergence device 100 is moved through intermediate positions as the pick-up truck 105 increases speed. For example, at a first speed, the wake convergence device 100 may be moved into a first deployed position; and, at a second speed, the wake convergence device 100 may be moved into a second deployed position. In at least one embodiment, the top panel 120 and the side panels 122 of the wake convergence device 100 are separate panels. In such an embodiment, each panel 120 and 122 may be moved to a different deployed position 152. The deployed position 152 of the wake convergence device 100 as a whole or each separate panel 120 and 122 of the wake convergence device 100 may depend on the speed of the pick-up 105, the speed of the wind, the direction of the wind, or other factors.

In at least one embodiment, the top panel 120 of the wake convergence device 100 may also be configured to rotate toward or away from the horizontal plane 114 of the pick-up truck 105. For example, an angle of the top panel 120 of the wake convergence device 100 with respect to the horizontal plane 114 of the pick-up truck 105 may be altered as the pick-up truck 105 reaches a pre-determined speed or gradually as the pick-up truck 105 increases speed. In at least one embodiment, the leading edge 124 of the top panel 120 may rotate up or down with respect to the top of the pick-up truck 105. In at least one embodiment, the trailing edge 126 of the top panel 120 may rotate up or down with respect to the top 111 of the pick-up truck 105.

In at least one embodiment, the side panels 122 of the wake convergence device 100 may also be configured to rotate toward or away from the vertical plane 112 of the pick-up truck 105. For example, an angle of each side panel 122 of the wake convergence device 100 with respect to the vertical plane 112 of the pick-up truck 105 may be altered as the pick-up truck 105 reaches a pre-determined speed or gradually as the pick-up truck 105 increases speed. In at least one embodiment, the leading edge 132 of each side panel 122 may rotate in or out with respect to the side of the pick-up truck 105. In at least one embodiment, the trailing edge 134 of the side panel 122 may rotate in or out with respect to the side 109 of the pick-up truck 105.

The height of the top panel 120 may be adjustable by utilizing different size moveable brackets 140. The distance of the side panels 122 from the side 109 of the pick-up truck 105 may also be adjustable by utilizing different size moveable brackets 140. Additionally, a "break-away" feature in the mounting of the panels 120 and 122 may be added to allow for the reduction of damage in case of collision with foreign objects such as tree branches etc. The break-away feature may include a frangible portion within the moveable brackets 140. When a panel 102 or 122 is subjected to force, the frangible portion breaks so that the panel 120 or 122 breaks away from the pick-up truck 105.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed is:

1. A wake convergence device for a pick-up truck including a cab, the wake convergence device comprising:
   a top panel operably coupled to the cab of the pick-up truck; and
   at least one side panel operably coupled to the cab of the pick-up truck, wherein the wake convergence device is moveable between a stowed position and a deployed position, the top panel and the cab defining a first spacing therebetween in the stowed position, the at least one side panel and the cab defining a second spacing therebetween in the stowed position, and the top panel and the cab defining a third spacing therebetween in the deployed position, the at least one side panel and the cab defining a fourth spacing therebetween in the deployed position, wherein the first spacing is different than the third spacing and wherein the second spacing is different than the fourth spacing.

2. The device of claim 1, wherein the third spacing is greater than the first spacing.

3. The device of claim 1, wherein the fourth spacing is greater than the second spacing.

4. The device of claim 1, wherein the wake convergence device is positioned at an aft end of the cab.

5. The device of claim 1, wherein, in the deployed position, at least a portion of the wake convergence device is positioned aft of an aft end of the cab.

6. The device of claim 1, wherein the top panel includes a leading edge and a trailing edge, wherein the leading edge rotates at least one of up or down with respect to the top of the cab.

7. The device of claim 1, wherein the top panel includes a leading edge and a trailing edge, wherein the trailing edge rotates at least one of up or down with respect to the top of the cab.

8. The device of claim 1, wherein the at least one side panel includes a leading edge and a trailing edge, wherein the leading edge rotates at least one of in or out with respect to the side of the cab.

9. The device of claim 1, wherein the at least one side panel includes a leading edge and a trailing edge, wherein the trailing edge rotates at least one of in or out with respect to the side of the cab.

10. The device of claim 1, wherein the wake convergence device moves to the deployed position when the pick-up truck reaches a pre-determined speed.

11. A wake convergence device for a pick-up truck including a cab comprising:
    at least one panel operably coupled to the cab of the pick-up truck; and
    an actuating device coupling the at least one panel to the cab, the actuating device moving the at least one panel between a stowed position and a deployed position, the at least one panel and the cab defining a first spacing therebetween in the stowed position, and the at least one panel and the cab defining a second spacing therebetween in the deployed position, wherein the first spacing is different than the second spacing.

12. The device of claim 11, wherein the second spacing is greater than the first spacing.

13. The device of claim 11, wherein the at least one panel is positioned at an aft end of the cab.

14. The device of claim 11, wherein, in the deployed position, at least a portion of the at least one panel is positioned aft of an aft end of the cab.

15. The device of claim 11, wherein the at least one panel includes a leading edge and a trailing edge, wherein the leading edge rotates at least one of up or down with respect to a top of the cab.

16. The device of claim 11, wherein the at least one panel includes a leading edge and a trailing edge, wherein the trailing edge rotates at least one of up or down with respect to a top of the cab.

17. The device of claim 11, wherein the at least one panel includes a leading edge and a trailing edge, wherein the leading edge rotates at least one of in or out with respect to a side of the cab.

18. The device of claim 11, wherein the at least one panel includes a leading edge and a trailing edge, wherein the trailing edge rotates at least one of in or out with respect to a side of the cab.

19. The device of claim 11, wherein the at least one panel moves to the deployed position when the pick-up truck reaches a pre-determined speed.

20. The device of claim 11, wherein the at least one panel is capable of breaking away from the actuating device.

* * * * *